United States Patent Office 3,748,244
Patented July 24, 1973

3,748,244
PROCESS AND APPARATUS FOR ELECTRIC CELL TREATMENT OF LIQUOR
Allan Boyd Earl Gilchrist, Westlake, Ohio, assignor to SCM Corporation, Cleveland, Ohio
Continuation-in-part of application Ser. No. 166,436, July 27, 1971, now Patent No. 3,679,565, which is a continuation-in-part of abandoned applications Ser. No. 76,311, Sept. 28, 1970, Ser. No. 91,905, Nov. 23, 1970, and Ser. No. 94,267, Dec. 2, 1970. This application July 25, 1972, Ser. No. 274,850
Int. Cl. B01k 5/00; B01d 13/02
U.S. Cl. 204—180 R           7 Claims

ABSTRACT OF THE DISCLOSURE

Liquor containing electrocoating paint or dispersed binder therefor can be processed for separation of components in a cell by the improvement which comprises maintaining opposed electrodes therein supplied with D.C. current flow at a current density in excess of that which will initiate electrodeposition on one of the electrodes under substantially quiescent cell conditions; these electrodes are grossly porous, e.g., pads of metal turnings, and interposed between them is an electrically non-conductive turbulence arrester, also grossly permeable to said liquor; the electrode which is subject to electrodeposition is supplied with a recirculating flow of liquor through it sufficiently high to maintain substantially unattenuated electric current flow between the electrodes; the cell preferably is fed between the turbulence arrester and the deposition electrode; liquor enriched as to binder is withdrawn from a collection chamber communicating with the deposition electrode; liquor depleted in such binder is withdrawn from a chamber communicating with the opposite electrode. Apparatus for such process is shown.

Figure 1:
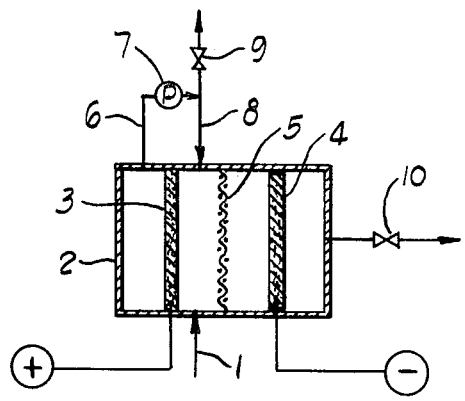

This application is a continuation-in-part of my copending U.S. patent application Ser. No. 166,436, filed July 27, 1971, now U.S. Pat. No. 3,679,565, which in turn was a continuation-in-part of my abandoned U.S. patent applications Ser. No. 76,311 of Sept. 28, 1970; Ser. No. 91,905 of Nov. 23, 1970; and Ser. No. 94,267 of Dec. 2, 1970. This application is related also to my copending application Ser. No. 99,120 of Dec. 17, 1970, now abandoned. The teachings of these applications are incorporated herein by reference.

This invention relates to improvements in process and apparatus for electric cell treatment of electrically conductive aqueous liquor containing electrocoating paint or dispersed binder therefor which would otherwise provide at the operating current density fluent electrodeposit (having electrical conductivity lower than the liquor in process) on one of the electrodes at substantially quiescent conditions. Such one of the electrodes for convenience is nominated as a deposition electrode.

The prior proposals deemed most pertinent to this invention are those shown in my copending application Ser. No. 166,436, wherein at least one microporous electrode is used, and the one shown in U.S. Pat. 1,603,298. The latter patent is directed to separating water solutions of mixed metalliferous electrolytes using a pair of opposed, finely porous electrodes at a voltage too low to cause the metals to electroplate on the electrodes. The ensuing electrically stressed percolation is stated to yield fairly pure materials in a cascading arrangement of the permeate flows. Cell outlets are from the permeate collection chambers; there is no provision for handling electrically resistive material such as a resin or a paint or a gel or an oil having the propensity to build up electrical resistance on an electrode. The useful voltage necessarily is extremely limited.

In another proposal (U.S. Pat. 2,905,604) black liquor from sulfate pulping of wood is treated in an electrolytic cell to coat out lignin on an anode surface and scrape it away therefrom. Broadly related to this is U.S. Pat. 2,919,235, which shows the collection of electrolytically produced insoluble hydroxide on an electrode surface which is cleansed ultrasonically. The art of electrolytically producing caustic soda and chlorine from sodium chloride is replete with the use of perforated electrodes, as generally is the art of electrolyte purification, e.g., acetic acid solutions, and the like.

Other more remotely pertinent apparatus and processes for electric filtration and electrodecantation also have been proposed heretofore. U.S. Pat. 2,640,026 shows feeding of contaminated liquids such as water into a zone bounded by an inner metallic filter screen electrode, whence the liquid passes through that electrode into an annular zone between that screen electrode and an outer metallic filter screen electrode, having opposite charge, the two being maintained in an insulating casing, the operation being to induce sedimentation from the water in process. The patent shows a way to introduce the liquid so as to electrically insulate the apparatus from feed and drain connections.

U.S. Pat. 1,231,967 shows pressure cell process and apparatus for electrolytic recovery of metals from their solutions whereby a series of electrode pairs are arranged in the manner of a plate-and-frame filter press with the feed liquor being passed into the cell zones to obtain precipitation of a filter cake on porous cathodes suitably covered with a filter cloth. Periodically the filter cake is sluiced or otherwise removed from the cathode covers.

U.S. Pat. 2,116,509 shows an electric dehydrater for inducing flocculation of foreign materials such as emulsified oil particles to induce their coalescence or sedimentation wherein a charged aqueous emulsion is passed through a first non-conducting filter juxtaposed to a charged electrode screen, thence into a sedimentation zone with water leaving that zone through another oppositely charged electrode screen juxtaposed against a second non-conducting filter to yield clarified water. The operation appears broadly analogous to that of U.S. Pat. 2,640,026 and is representative of a variety of electrostatic precipitations, also old in the art. In such apparatus, the filter beds can tend to clog with film-forming material as they are not current-carrying heat-conductive members, even though porous.

A further and even more remote electrical cell arrangement for dewatering a filter cake is proposed in U.S. Pat. 1,435,886 whereby filter cake on a porous drum cathode is stressed with an anode slipper or the like to dewater it. While not a pressure cell, dewatering of the cake such as cornstarch is done apparently electroendosmotically and the cake is scraped off the drum similarly to that on a conventional continuous rotary vacuum filter.

U.S. Pat. 1,357,401 relating to a chlor-alkali cell, and U.S. Pat. 805,969, relating to a metals separation cell, show coarsely porous diaphragms around a cathode electrode which reduces velocity and turbulence of liquor at the surfaces of such electrode.

In the art of electrocoating of paint, with the paint attracted to an anodic substrate, removal of excess or offending ions from the paint bath has been proposed by means of dialysis, ion exchange, and various species of electrodialysis such as those using rigid or deformable membranes and ionic membranes. Principal patents in this field include my U.S. Pat. 3,230,162 of Jan. 18, 1966, and 3,304,250 of Feb. 14, 1967, wherein pH of electrocoating bath is shown to be maintained by electrodialysis while an electrode substrate is being coated. Also illustrative are U.S. Pats. 3,419,388; U.S. 3,496,083; and Japanese patent publication No. 13231/1970 of May 13, 1970. Electrocoating paints also can be made to be attracted to a cathodic substrate as, for example, those paints shown in U.S. Pat. 3,455,806 and others representative of this aspect of the electrocoating art.

To treat electrocoating paint baths or waste waters therefrom, e.g., rinse water, for reuse or disposal, it has been proposed to use ultrafiltration and reverse osmosis devices and techniques for alleviating waste disposal problems (e.g., U.S. Pats. 3,528,901, 3,556,970, British Pat. 1,071,458; and U.S. Pats. 3,663,397 through 3,663,407, inclusive). These both can be effective, but have been costly because the equipment used is essentially of low capacity per unit of invested capital. Also of collateral pertinence is U.S. Pat. 3,526,588.

The instant invention provides a practical way for extended duration electrolytic treatment of the electrically conductive liquor containing dissolved electrolyte and electrocoating binder or paint containing same, which, at the comparatively high operating current densities on the deposition electrode useful herein, otherwise would form an electrodepoist that can build up the electrical resistance on the deposition electrode and so curtail the operation. It provides a means for depleting water, soluble electrolyte, and/or the electrodepositing material (paint binder, optionally with codepositing pigments and other codepositing paint components) from the liquor; practical separations, depletions, and enrichments can be obtained at attractively high rates. A plurality of the cell units can be cascaded as to one or more of the effluents for similar electrolytic treatment, or the various effluent can be treated further in conventional manner by, e.g., ion exchange, distillation such as vacuum distillation, conventional or selective filtration, reverse osmosis (including ultrafiltration), electrodialysis, neutralization, or the like.

One aspect of this invention is an improvement in process for treating electrically conductive aqueous liquor containing electrocoating paint binder in a cell zone having opposed electrodes powered from an external source with net unidirectional electric current passing through the liquor therebetween; each of said electrodes is grossly porous to the liquor and each communicates by its permeability with a liquor collecting zone. Interposed between the electrodes in the cell zones is electrically non-conductive turbulence arrester means also grossly permeable to said liquor. In effect, this turbulence arrester means divides the cell into a fairly turbulent side about the deposition electrode and a fairly quiescent zone about the opposite electrode, which can be characterized conveniently as a depletion electrode. Said liquor is introduced into the vicinity of the deposition electrode, preferably between the turbulence arrester and the deposition electrode. Flow through the deposition electrode goes into a liquor collection zone communicating with the deposition electrode and is continuously recirculated at a rate effective for maintaining substantially unattenuated current flow between the electrodes at a rate in excess of the practical electrodeposition initiation current density of the deposition electrode (that current density for incipient electrodeposition of paint binder or paint on the deposition electrode under quiescent conditions). A portion of the collected flow through the deposition electrode is bled from the cell as enriched liquor while depleted liquor is withdrawn as a bleed through the depletion electrode, the bleeds of withdrawn liquor being adequate to establish and maintain substantially volumetric balance with the inlet feed liquor to the cell.

Another aspect of this invention is an improvement in cell apparatus for the treatment of an electrically conductive liquor that has material therein which can electrodeposit on one of the electrodes to form a deposit that is less conductive than said liquor. Such cell comprises: a casing impermeable to said liquor; opposed electrodes disposed apart from each other in said casing, each said electrode being grossly permeable to said liquor and disposed for accepting the unidirectional electric power supply; a chamber communicating with each electrode for collection of liquor flow through said electrode; an electrically non-conductive turbulence arrester interposed between said electrodes, said turbulence arrester being grossly permeable to said liquor; a liquor feed inlet in the vicinity of one of said electrodes; a pump disposed to recirculate liquor between the chamber communicating with said one of said electrodes and the space between said one of said electrodes and said turbulence arrester; an enriched liquor bleed line from the vicinity of said one of said electrodes; and a depleted liquor bleed line from the chamber communicating with the other of said electrodes.

For a given electrically conductive aqueous liquor containing electrocoating paint or dispersed resinous binder thereof the initiation current density of the deposition electrode can be found as follows: suspending two like, vertical, opposed solid plate A.I.S.I. type 316 austenitic stainless steel electrodes each having 30 sq. cm. faces 2.5 cm. apart from each other in a body of such liquor at proposed cell operating temperature (generally about 26.67–60° C.) under quiescent conditions, with the backs and edges of the two electrodes coated with electrical insulation that will not break down, e.g., varnish or electric insulating tape; D.C. voltage between the electrodes gradually is raised from zero at a rate of 0.1 volt per second and the amperage flow and time in seconds is metered. When the amperage breaks downward, it is read; divide the current at break by 30 (the area of deposition electrode face). At the high circulation rates contemplated for this invention operation can be maintained without current break (or effective electrodeposition on the deposition electrode) at current densities of 10 to 20 times such initiation current density.

As this invention is practiced at higher current density than such initiation value, an electrodeposit of the paint or binder is tending to form at all times. Whether this film is thought of as being precluded from forming substantially, removed or resolubilized or redispersed at least about as fast as it is formed, or whatever the mechanism, the net effect is removal of the film adequate for establishing and maintaining appreciable amperage for the electrical separation at an operating current density above the initiation current density. This imparts separating efficiency to the process and apparatus.

FIG. 1 of the drawings shows a flow diagram for the treatment of conventional anodic electrocoating paint (e.g., 12% N.V.M.) or wash water from rinsing electrocoated anodes (1% N.V.M.). Electric current supply apparatus and instrumentation are not shown as these are conventional. The drawing is depicted in plan using an open-top tank or casing. Also it should be understood that the tank or casing can be covered.

Flow of feed liquor enters inlet line 1 of insulated, open-top tank 2, which has rectangular cross section. Anode 3 is the deposition electrode, and cathode 4 the depletion electrode. Both electrodes are mats of stainless steel turnings about 1–2 cm. thick resembling framed air filters for window air conditioners. They are separated by turbulence arrester 5, a framed coarsely and loosely woven glass cloth of about 1 mm. diameter threads with smaller holes (about 0.2–0.4 mm.) apertures in the weave (scrim). Obviously more than one turbulence arrester can be so interposed if desired. Alternatively, turbulence can be arrested without flow damping means by extending the distance between the electrodes, but this is costly in electric power. Cell liquor flows to the left through anode 3 and into pump suction line 6. A portion of this liquor is bled from the system through valve 9 as enriched liquor. Most of it, however, is recirculated by pump 7 through line 8 at a rate sufficiently high to maintain current flow unattenuated at selected voltage between the electrodes maintained at 30–300 volts differential (e.g., about 35–80 ml./min./sq. cm. of anode cross section at face). For many practical anodic electrocoating paints the initiation current density at the anode face will be about 0.003 ampere per square cm. of such face (measured as a flat plate) for electrodeposition under quiescent conditions. With recirculation this value, of course, is many times higher. It is advantageous to cool recirculating flows indirectly by conventional means not shown.

Depleted liquor flowing through arrester 5 and cathode 4 is bled from the system using valve 10. Output from the anode and cathode bleed lines is made up with input feed liquor entering line 1 to maintain the cell substantially full and the electrodes bathed with liquor, but not overflowing their tops nor the top of the turbulence arrester.

In many cases when feeding an anodic electrocoating paint bath liquor it is desirable to make the cross sectional area of the cathode face at least several times smaller than the anode cross sectional area facing it, thereby having substantially greater electric current density at the cathode.

When the feed liquor contains a cathodic electrocoating paint or binder therefor, the polarity of this cell is reversed for such related separation purpose, that is, concentrating paint solids in the cathode liquor and depleting it in the anode liquor.

Voltage of the operation is conveniently 20 to 250+ volts and advantageously about 30 to 150 volts for maintaining current flow between electrode faces when they are spaced apart about 2–20 cm. and the specific resistivity of the cell liquor is about 200 to 5000 ohm-centimeters at operating temperature of the cell. No noticeable anodic electrodeposition of insulating paint or paint binder takes place when the recirculation rate is high (e.g., in excess of about 35 ml. per square cm. per minute of deposition electrode face). Such deposition generally is abruptly evident on an ammeter measuring cell current; a minute film ordinarily inhibits current flow drastically. Circulation can be done above 150 ml. per square cm. per minute, but usually is wasteful of power.

Figure 2:
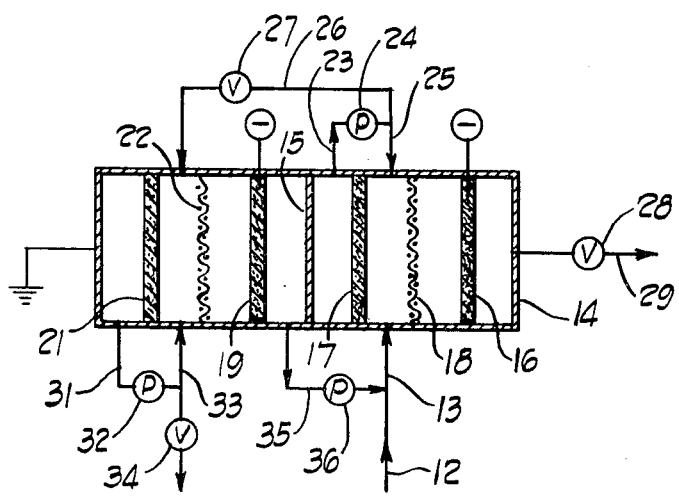

FIG. 2 is a flow diagram in plan of a pair of the cells similar to that in FIG. 1 mounted in a cascading arrangement with cooling means (not shown) for lines 25 and 33.

Free liquid, anodic electrocoating paint having, say, 10% N.V.M., is fed through lines 12 and 13 into metal tank 14. This tank is divided into similar cells by impervious divider 15, and the tank is grounded electrically. Coarsely porous electrodes 16, 17, 19, and 21, for example, pads of metal turnings (like those of FIG. 1) and insulated turbulence arresters 18 and 22 (like that of FIG. 1) further divide the tank into a plurality of zones. Anodes 17 and 21 make electrical connection with the metal tank walls and therefore are at ground potential. The rest of the interior of tank 14 is coated with permanent electrical insulation walls, and bottom. Cathodes 16 and 19, suitably connected in parallel electrically, are insulated from and make no electrical connection with the tank; they are negative with respect to ground potential (for example, minus 30 to minus 300 volts differential). Cell liquor from the right-hand cell that flows through anode 17 goes into the collection zone left of such anode, flows out line 23, and most of it is recirculated by pump 24 and line 25 back to the space immediately to the right of anode 17, that is, at the face of anode 17. While it would be feasible to feed part or all of the fresh feed liquor into the collection zone left of such anode, and even to reverse the circulation of liquor flow through such anode, it is felt that the separation of solids is enhanced by the preferred feed direction and recirculating flow direction shown.

Depleted cell liquor passes through arrester 18 and cathode 16 into the collection zone to the right of cathode 16. Then it is withdrawn from the system as a bleed through valve 28 and outlet 29.

The balance of the anolyte flow from pump 24 is directed through line 26 and valve 27 as a bleed entering the lefte-hand cell between turbulence arrester 22 and the face of anode 21. Cell liquor of the left-hand cell flowing through anode 21 goes into the collecting zone left of said anode, flows out line 31, and most of it is recirculated by pump 32 and line 33 back to the space immediately in front of anode 21. A bleed of enriched anolyte is removed from the system through valve 34. A bleed of depleted catholyte from the left-hand cell is fed by line 35, pump 36, and line 13 into the right-hand cell with feed from line 12. All inlet, outlet, and recirculating flows are maintained to keep both cells substantially full and the electrodes and turbulence arresters bathed with liquor, but not over-flowing their tops nor the top of divider 15.

When the feed liquor contains a cathodic electrocoating paint or binder therefor, the polarity of the two cells is reversed for related separation purpose, that is, concentrating paint in a cathode liquor and depleting it in an anode liquor. For safety the tank in such instance has exterior electrical insulation.

In advantageous embodiment of the multiple cell arrangement the feed liquor is rinse water from rinsing adhering electrocoating paint dispersion from anodic objects. It can have ½–1½% paint solids therein. Said liquor is fed through lines 12 and 13 like above described with respect to FIG. 2 for anodic electrocoating paint. The operation is otherwise obviously quite similar to the previous description for FIG. 2 and is an especially efficient way of electrically depleting the rinse water of solids so that the rinse water depleted in solids can be recycled and the solids recovered. It possible, of course, to reverse polarity in such instance to treat wash water from the electrocating of cathodes, or to use more than two of cells in series in the maner of FIG. 2, or to use them in parallel for additional capacity. In the instance where electrocoating rinse water is being treated, the cell taking such feed as free feed will be doing the most volume of separation and can be made larger than the other cells in series therewith working on increasing solids content effluents with obvious economic advantage.

There are several basic schemes for cascading effluent flows from a first cell to a similar cell or cells staged in series therewith to achieve enrichment or depletion or a liquor with respect to the solids therein. In the instance where one is removing a small amount of water from a comparatively concentrated cell feed one scheme is to remove from the system enriched liquor from the feed stage while feeding depleted liquor from the feed stage to the following stage, and to remove from the system depleted liquor from said following stage while returning enriched liquor from said following stage to said feed stage, and so on considering said following stage as the feed stage with respect to a third stage, etc. Such scheme in essence is operated to reprocess mainly dilute or depleted material.

In the instance where a large amount of water is being removed from a comparatively dilute cell feed a most practical scheme would appear to be removing from the system depleted liquor from the feed stage while passing enriched liquor from the feed stage to a following stage, and removing from the system enriched from said following stage while returning depleted liquor to said feed stage, and so on considering said following stage as the first stage with respect to a third stage, etc. This scheme in essence is operated to reprocess mainly enriched or concentrated material.

A third scheme is to feed to an an intermediate stage, then proceeding in both directions as outlined in this connection, that is, reprocessing enriched or concentrated material in the one direction while reprocessing dilute material in the other.

While the operation can be done, for example, at about room temperature, or even below, it often is preferred to maintain the temperature of the deposition electrode substantially above room temperature for reducing viscosity of the paint solids tending to deposit. The temperature can be maintained as high as about 50–70°, but not so high that the paint of components thereof in process undergo detrimental change.

Pressure used in the operation preferably is just slightly positive between the electrodes, but can be maintained much higher, e.g., 100 p.s.i.g. or even more, where the equipment can tolerate such pressure, if suppression of volatilization is desired. Advantageously for safety most, if not all, of the structural parts of the apparatus (except the electrodes) can be made of or coated with electrically non-conductive (insulating) materials such as glass, porcelain, or plastic. Large areas of exposed metal parts preferably are grounded, also for safety.

Waste heat is generated in the process. Some of such heat can be used to control fluency of liquors and solids in process. The balance of the heat can be removed from the cell by indirect cooling, for example, acting on an externally recirculating flow or feed, or immersed in and acting on the liquor in a cell.

The electrodes are made of metal, metal-coated non-conductors, or electrically conductive carbon such as graphite. They are grossly porous, advantageously a bed of metal turnings such as metal wool, and preferably an austenitic stainless steel wool to resist attack. Such wool can be bonded together but need not be, and can be retained between screens if desired. A stack of metal screens can be used also for structural simplicity. The electrodes are at least about one-half centimeter thick, and more generally 1–5 centimeters. Thicker deposition and depletion electrodes can be used to allow for wastage and erosion, but most of the operational effect appears to take place at the opposed electrode surfaces facing each other. Pressure drop through the electrodes should be very slight (a fraction of a centimeter of water up to suitably about 10 centimeters of water when blowing air at room temperature therethrough at the rate of a liter a minute per square cm.).

The turbulence arrester preferably is perforated plastic or glass, grossly permeable, with holes of 0.1 millimeter diameter or larger, and a thickness of one-half centimeter to several centimeters to give a flow-straightening effect. Alternatively straightening vanes or guides can be used, or coarse woven or nonwoven cloths or battings of one or several layers, such as burlap, glass fiber, plastic, or a stack of plastic screens. The largest paint particles, which generally are lead and chromate-containing pigments, should pass through such arrester and the electrodes with virtually no retention, which would cause eventual plugging. A large practical hole size would be about one cm.² for straightening vanes or perforations in a sheet or block. The holes in such arrester and the electrodes can go down to fractions of a millimeter, e.g., effectively 0.1 mm. or even less.

The current between anode and cathode of the cell apparatus should be net unidirectional. It can have pulsed or have shaped nodes, but preferably is rectified A.C. with no more than about a 15 percent ripple factor. Where straight line D.C. power is available, this, of course, can be used with excellent effect.

The voltage used is above that necessary to electrolytically dissociate some of the water in the liquor, that is, above about 1.8 volts, whereby hydrogen is liberated from the cathode and oxygen from the anode. With adequate recirculation through the deposition electrode I have found that I can reach well in excess of 250 volts between the electrodes without getting net resinous deposition. The cell, of course, is vented to rid it of gases.

By an "electrocoating paint" I mean a film-forming binder material, generally a resin, but also possibly polymerizable monomers or low-molecular weight substance, dispersed in water with the aid of an ionizing agent that ionizes at least a portion of ionizable sites in the structurally ionic material that forms a significant fraction of said binder. Such dispersion can contain optionally substantially nonionic extender resins, pigment, filler, stain, colorant, organic solvent, plasticizer, heat-fusible or practically infusible resin particles, antifoam agents, glass frit, or wetting agents, and other ingredients conventional in anodic and cathodic electrocoating paints. Concentrates of such paints contain 0–70 percent water and often have no, or very little, ionizing agent.

The following examples show ways in which this invention can be practiced, but should not be construed as limiting the invention. In this application all parts are parts by weight, all percentages are weight percentages, and all temperatures are in degrees centigrade unless otherwise expressly indicated.

EXAMPLE 1

A vertical cell unit, a 2.25 inch I.D. cylindrical plastic case 17 cm. tall with flat plastic flanges top and bottom, was fitted with an anode mat of 20 grams of stainless steel wool (2.25 inch diameter and 2 cm. thick supported by a stainless steel screen at its base) retained near the bottom of the case, a packing bundle of ⅜ inch O.D. vertical plastic tubes 4 cm. long as a turbulence arrester situated intermediate in the cell (the bottom of such bundle being 6 cm. above the top surface of the anode), and a cathode near the enclosed top.

The cathode was a 1.25 inch diameter by 2 cm. thick pad of 10 grams of stainless steel wool retained in a ring retainer projecting from the center of the top of the unit. The lower face of the cathode was 3 cm. above the upper face of the turbulence arrester. Cross-sectional anode area was 4 square inches (25.8 cm.²) and that of the cathode 1.2 square inches (7.75 sq. cm.).

The bottom flange had a drain line supplying an anode recirculating pump which discharged into the side of the case between the bottom of the turbulence arrester bundle and the anode. Feed liquor was fed into the same space. A small bleed line led from the pump discharge. This anode recirculation was cooled indirectly with tap water. Circulation rate was about 1–2 liters per minute.

Treated liquor that flowed through the cathode went upwardly and was taken out of the unit through an outlet positioned thereabove that supplied suction to a cathode pump. The cathode pump discharge was fitted with a purge outlet and a recirculation return line into the space between the top of the turbulence arrester and the bottom anode face.

The paint used was a conventional anodic electrocoating paint having as vehicle a maleinized linseed oil that had been reacted with vinyl toluene and extended with a non-heat-reactive phenolic resin. The amine dispersant used in the aqueous mixture was monoethanolamine, and the feed liquor of the paint was 11.8% non-volatile matter (N.V.M., measured by evaporating a small sample at 110° C. to constant weight). Pigmentation of the paint was carbon black, lead silico-chromate, and clay. The initiation current density of this paint dispersion was 0.003 ampere per sq. cm.

The cell was charged full using about 1100 ml. of this paint as fresh feed liquor. D.C. voltage (rectified A.C.) was impressed between anode and cathode at 180 volts, but this was decreased almost immediately to 150 volts to arrest temperature rise in the cell. Both the recirculation pump and the cathode pump were operated on total recycle for 25 minutes until the cathode zone clarified considerably. Cathode recirculation rate was small, starting at about 30 milliliters per minute and being reduced down to 4 per minute. Then, while the anode recirculation was maintained, cathode recirculation was shut off and a treated cathode output flow of 13.6 grams per minute was withdrawn for five minutes. It had 4.5% N.V.M.

A similar operation was done periodically at 14 intervals until 60 minutes had elapsed with 50 grams of the treated cathode output being reserved during each interval and the remainder added to fresh feed, which was put in to maintain the cell full at all times. At the end of 40 minutes the amperage was lowered from ¾ amp to ½ amp across the electrodes. After 60 minutes the withdrawal rate of the treated cathode output flow drawoff was lowered to 30 gram increments in five minutes' elapsed time. The N.V.M. of the cathode flow, which for the previous cathode output flows had been between 4.37 and 5.09%, declined to 2.2% to finally 1.76% at the end of 100 minutes with three more cathode output increments being removed from the cell. At the end of the run the liquor retained in the cell had 13.2% concentration N.V.M.

EXAMPLE 2

In a test using the same cell as in Example 1, with the aqueous feed liquor being at 1% paint concentration (resembling rinse water from electrocoated anodes) instead of 11.8%, treated catholyte with withdrawn continuously during the run at the rate of 19 g. per minute, and it contained 0.3% N.V.M. To keep the cell full, the 1% feed was added continuously. The run was done at 250 volts between anode and cathode and 0.2 ampere for 65 minutes. At the end the concentration of solids retained in the cell was 1.21%. The initation current density for this liquor and those of the feed liquors in the rest of the Examples was about the same as in Example 1.

EXAMPLE 3

In a run like that of Example 2 except that the aqueous feed liquor contained 2.6% solids and the treated catholyte withdrawal rate was 1.6 grams per minute containing 0.8% N.V.M., the voltage used was 200 volts, and the amperage 0.3. The run was for 110 minutes to give a retained liquor in the cell of 3.64% N.V.M.

EXAMPLE 4

In a run like that of Example 2 except that the aqueous feed liquor contained 5.07% solids and the treated catholyte withdrawal rate was 10.6 grams per minute containing 1.14% N.V.M., the voltage used was 235 volts, and the amperage 0.8. The run was for 70 minutes to give a retained liquor in the cell of 6.55% N.V.M.

EXAMPLE 5

From the foregoing Examples 2-4 the following series operation of feeding 1% liquor like that of Example 2 into a top cell, bleeding solids-depleted catholyte from the top thereof and from the system, feeding a lower cell with the anolyte bleed from the top cell, withdrawing an anolyte bleed from the lower cell and from the system, said bleed enriched in paint solids, and recirculating a catholyte bleed from the lower cell into the feed inlet of the upper cell, was designed. Each cell was like that described in Example 1, and their series connection was like that shown in FIG. 2.

As a basis of design the cells were to have the following operation: the upper cell charged initially with feed liquor for running at total recycle until substantial separation equilibrium was established therein, then anolyte bled slowly from the upper cell to fill the lower cell, and the cells then run at total recycle to establish substantial equilibrium in both of them, the anode recycle rates being each about 2 liters per minute and the catholyte recycle rates much lower, i.e., about 25 ml. per minute; then, at such stage, about 6 grams per minute of depleted catholyte from the lower cell, estimated to contain 0.8% solids, bled out of the lower cell and fed into the space between the anode and turbulence arrester of the upper cell together with sufficient fresh feed liquor to keep the cells full; catholyte bleed estimated at about 0.3% solids withdrawn from the top of the upper cell at 19 grams per minute; upper and lower anode recirculation maintained at about 2 liters per minute; anolyte bleed from the upper cell estimated at 9 grams per minute and 2.4% solids to supply the lower cell between the turbulence arrester and anode thereof; and lower cell anolyte bleed from the system estimated at 3 grams per minute and 5.6% solids.

EXAMPLE 6

Foreshortening of the cell described in Example 1, for operation like that of Example 2, from 17 cm. long to 4½ cm. long, with a shortening of the tubing bundle turbulence arrester from 4 cm. to the thickness of coarse glass cloth (scrim described above) and spacing of the electrodes closer together, gave essentially the same kind of operation as that described in Example 2, except that the voltage and power requirements were about cut in half. From this experiment it was shown that fairly close spacing of the electrode faces and the use of an effective but comparatively thin turbulence arrester, e.g., one or a plurality of glass cloth sheets or the like, would be effective for improving electrical efficiency of the operation.

What is claimed is:

1. In a process for treating electrically conductive aqueous liquor containing electrocoating paint binder in a cell zone having opposed electrodes externally powered with net unidirectional electric current passing through said liquor therebetween, wherein each of said electrodes are grossly porous to said liquor and each communicates by its permeability with a liquor collection zone, the improvement which comprises:
    maintaining between said electrodes in said cell zone an electrically non-conductive turbulence arrester also grossly permeably to said liquor, one of said electrodes being a deposition electrode and the other a depletion electrode;
    feeding said liquor in the vicinity of said deposition electrode;
    collecting flow through said deposition electrode from the liquor collection zone communicating therewith;
    continuously recirculating sufficient of said collected flow through said deposition electrode at a rate effective for maintaining substantially unattenuated electric current flow between said electrodes at a current density above the initiation current density of said liquor;
    withdrawing a portion of said collected flow through said deposition electrode as enriched liquor; and
    withdrawing flow through said depletion electrode as depleted liquor.

2. The process of claim 1 wherein said feed of liquor is a rinse water from an electrocoating process.

3. The process of claim 1 wherein said feed of liquor is an electrocoating bath dispersion.

4. The process of claim 1 wherein said paint binder is anionic.

5. The process of claim 1 wherein said paint binder is cationic.

6. The process of claim 1 wherein there are are a plurality of similar cell zones like that of claim 1, one of them being fed with a feed of liquor as in claim 1, the next receiving as feed liquor a withdrawn flow of enriched liquor from the first one and returning to said first one a withdrawn flow of depleted liquor in augmentation of the feed to said first one.

7. The process of claim 1 wherein there are a plurality of similar cell zones like that of claim 1, one of them being fed with a feed of liquor as in claim 1, and the others connected thereto for depleting or concentrating paint solids in at least a portion of flows withdrawn from said one of them.

References Cited

UNITED STATES PATENTS

| | | | |
|---|---|---|---|
| 2,944,952 | 7/1960 | McMinn, Jr. | 204—180 R |
| 3,444,066 | 5/1969 | Brewer et al. | 204—181 |
| 3,671,412 | 6/1972 | Lohr | 204—181 |
| 3,682,806 | 8/1972 | Kinsella et al. | 204—181 |

JOHN H. MACK, Primary Examiner

A. C. PRESCOTT, Assistant Examiner

U.S. Cl. X.R.

204—299